(12) United States Patent
Brebner

(10) Patent No.: US 11,465,826 B2
(45) Date of Patent: Oct. 11, 2022

(54) LOCKING MEANS FOR A TRANSPORT CRADLE

(71) Applicant: Global Offshore ApS, Esbjerg (DK)

(72) Inventor: Paul John George Brebner, Esbjerg (DK)

(73) Assignee: Mercom Denmark, Esbjerg (DK)

( * ) Notice: Subject to any disclaimer, the term of this patent is extended or adjusted under 35 U.S.C. 154(b) by 121 days.

(21) Appl. No.: 16/758,906

(22) PCT Filed: Oct. 24, 2018

(86) PCT No.: PCT/EP2018/079209
§ 371 (c)(1),
(2) Date: Apr. 24, 2020

(87) PCT Pub. No.: WO2019/081604
PCT Pub. Date: May 2, 2019

(65) Prior Publication Data
US 2020/0317430 A1 Oct. 8, 2020

(30) Foreign Application Priority Data

Oct. 24, 2017 (GB) ..................................... 1717466
Jun. 19, 2018 (GB) ..................................... 1810063

(51) Int. Cl.
*B65D 85/20* (2006.01)
*B65G 1/14* (2006.01)
*E21B 41/00* (2006.01)

(52) U.S. Cl.
CPC ............... *B65D 85/20* (2013.01); *B65G 1/14* (2013.01); *B65G 2201/0276* (2013.01); *E21B 41/00* (2013.01)

(58) Field of Classification Search
CPC ........ F16L 3/2235; E21B 19/15; E21B 41/00; B65G 1/0442; B65G 1/14; B65G 2201/0276; B65D 85/20
See application file for complete search history.

(56) References Cited

U.S. PATENT DOCUMENTS 2,404,531 A * 7/1946 Robertson ............. F16L 55/035
248/68.1
3,023,989 A * 3/1962 White ................... F16L 3/2235
248/68.1

(Continued)

FOREIGN PATENT DOCUMENTS

GB 892665 A 3/1962
WO 2011/018614 A2 2/2011

OTHER PUBLICATIONS

International Search Report and Written Opinion for corresponding Patent Application No. PCT/EP2018/079209 dated Jan. 30, 2019.

*Primary Examiner* — Patrick D Hawn
(74) *Attorney, Agent, or Firm* — Renner, Otto, Boisselle & Sklar, LLP

(57) ABSTRACT

A releasable lock (11) for a pipe cradle is disclosed. The releasable lock (11) comprises an elongate arm (1), pivotally secured at a first end to a pivot end mounted on a cradle frame (12). At a second end the releasable lock comprises a locking element (3), said locking element (3) being moveable between a release position allowing pivoting of the elongate arm (1) about the pivot end and a gripping position preventing said pivoting. The pivot end is moveable about a pivot pin (10) housed on the cradle, said movement displacing the elongate arm (1) between a first release position allowing removal or addition of pipes (15) from/to a cradle and a second position in which pipes are secured in position in the cradle.

18 Claims, 4 Drawing Sheets

(56) References Cited

U.S. PATENT DOCUMENTS

| | | | | | |
|---|---|---|---|---|---|
| 3,612,286 | A | * | 10/1971 | Langowski | E21B 19/15 |
| | | | | | 211/70.4 |
| 4,610,362 | A | * | 9/1986 | Remp | F16L 3/2235 |
| | | | | | 206/443 |
| 4,706,822 | A | * | 11/1987 | Remp, Jr. | B65D 85/20 |
| | | | | | 206/443 |
| 5,098,047 | A | * | 3/1992 | Plumley | F16L 3/2235 |
| | | | | | 248/68.1 |
| 5,123,547 | A | * | 6/1992 | Koch | B65D 85/20 |
| | | | | | 211/59.4 |
| 5,860,627 | A | | 1/1999 | Edwards | |
| 6,119,861 | A | * | 9/2000 | Schneider | B65D 61/00 |
| | | | | | 108/53.1 |
| 6,182,837 | B1 | * | 2/2001 | Crabtree | B65D 81/05 |
| | | | | | 206/443 |
| 6,261,037 | B1 | * | 7/2001 | Richards | B65D 85/20 |
| | | | | | 410/36 |
| 7,080,864 | B2 | * | 7/2006 | Casteran | B65D 85/20 |
| | | | | | 211/60.1 |
| 8,807,612 | B2 | * | 8/2014 | Hagelskjaer | B65D 85/62 |
| | | | | | 294/67.3 |
| 10,472,145 | B2 | * | 11/2019 | Lu | B65D 67/02 |
| 2006/0060382 | A1 | | 3/2006 | Sewell et al. | |
| 2014/0304965 | A1 | * | 10/2014 | O'Brien | F16L 3/11 |
| | | | | | 29/426.2 |
| 2018/0162614 | A1 | * | 6/2018 | Lu | B65D 85/20 |

* cited by examiner

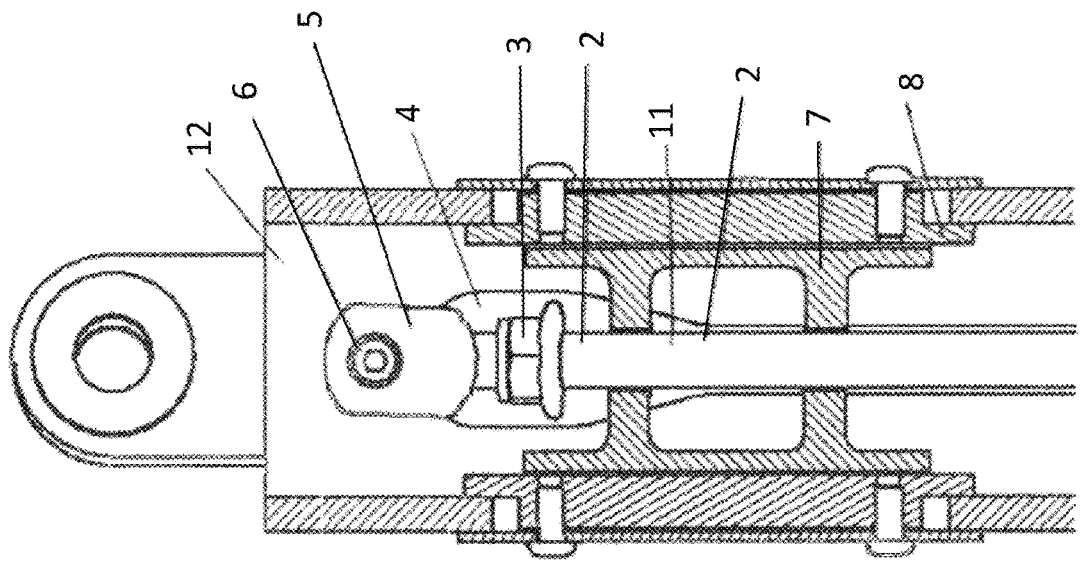
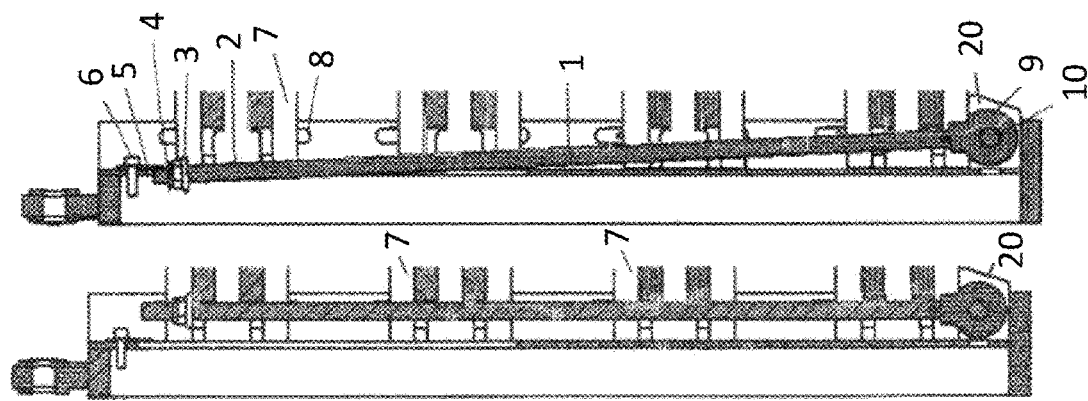

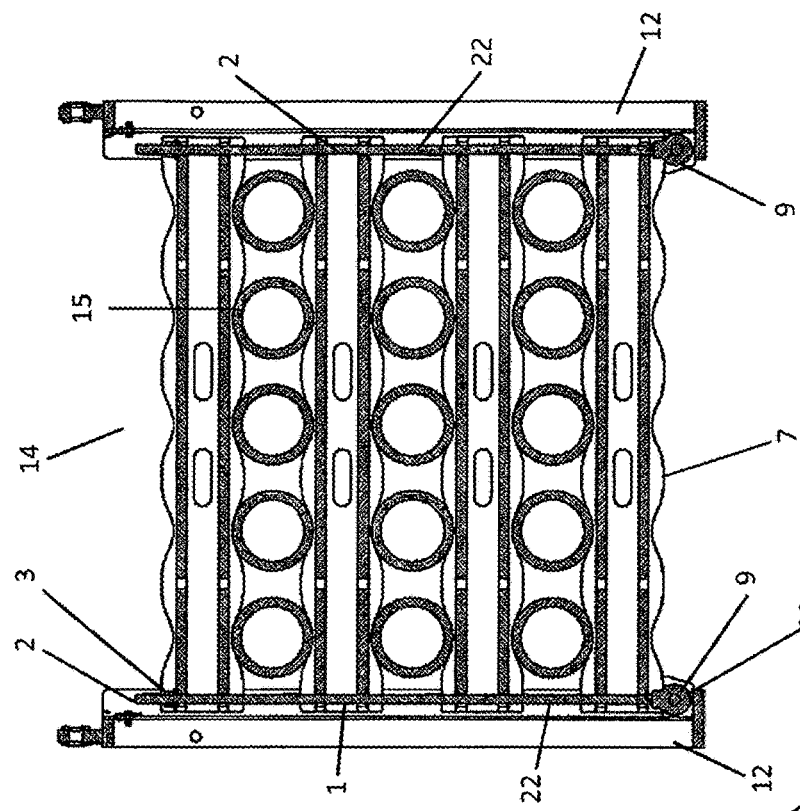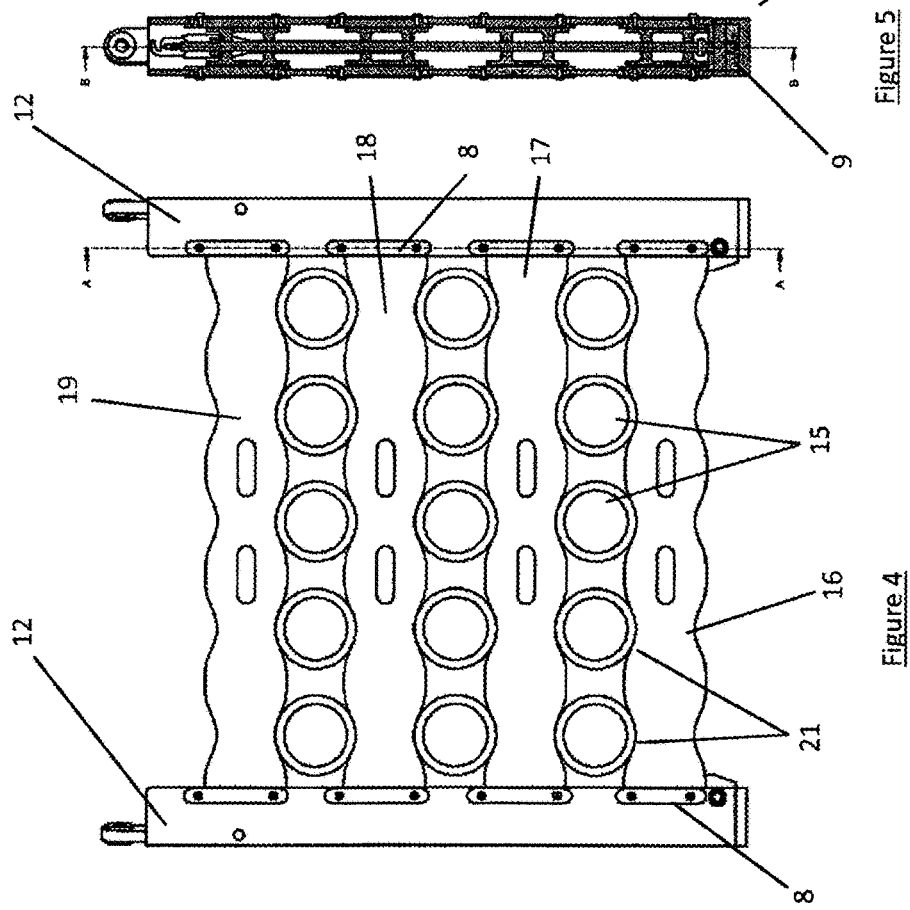

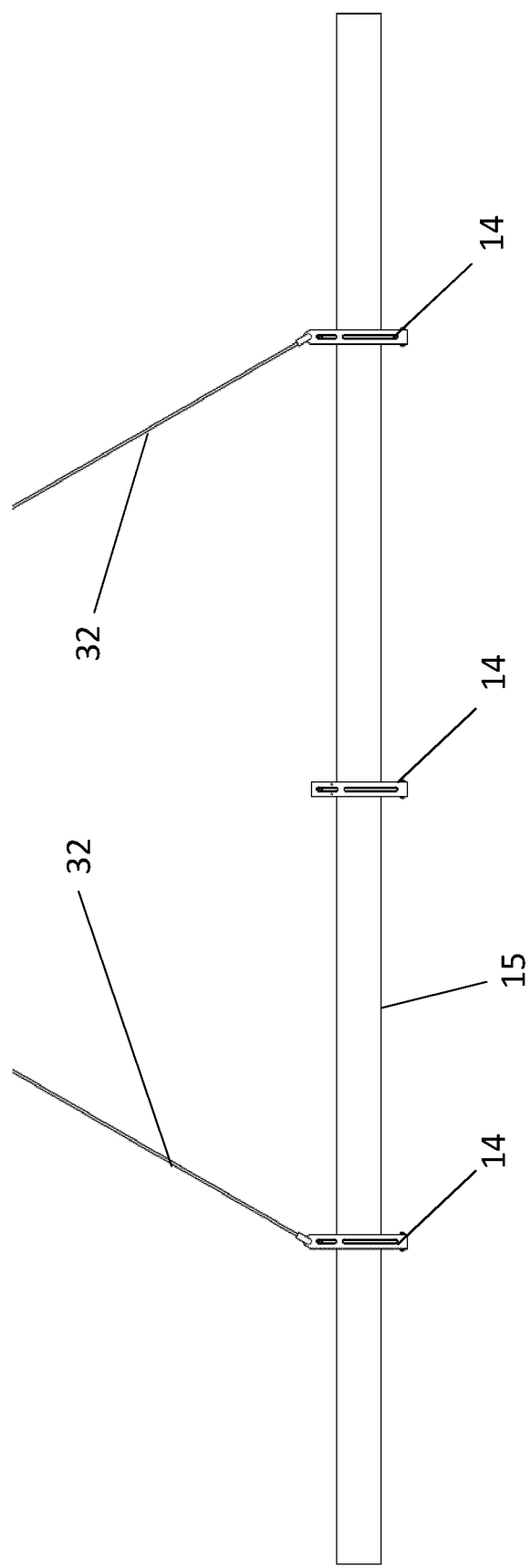

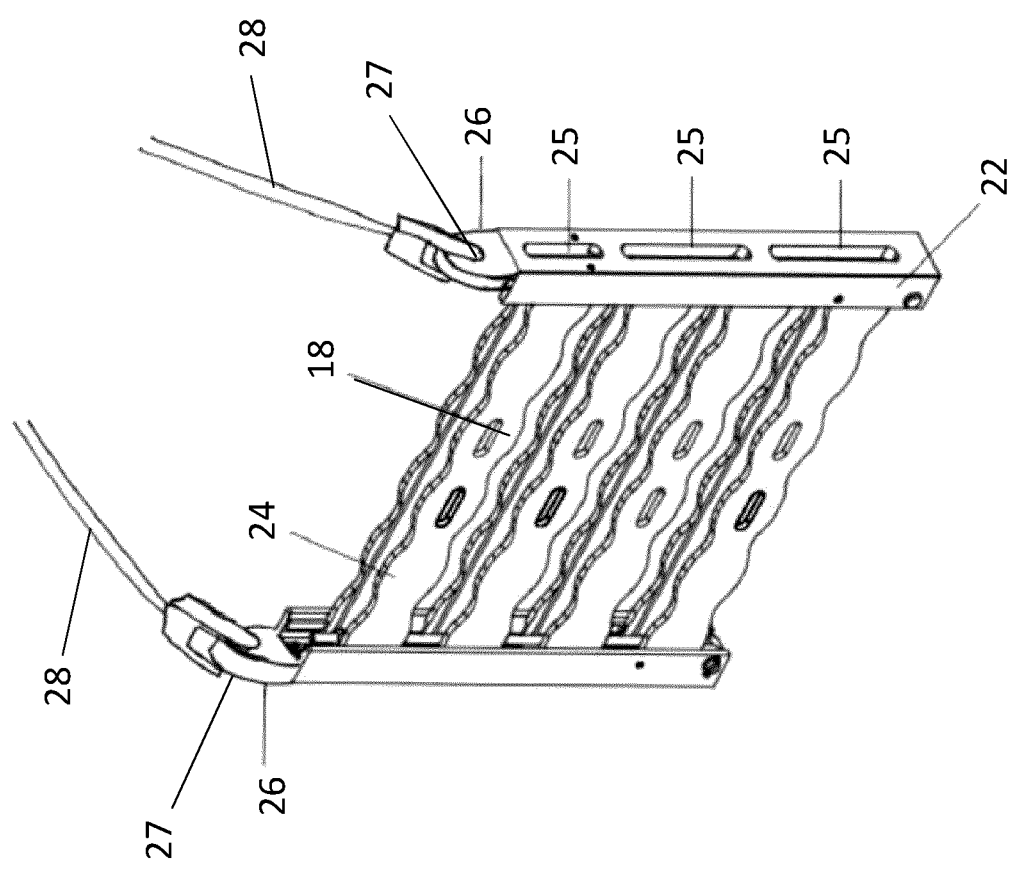

LOCKING MEANS FOR A TRANSPORT CRADLE

FIELD OF THE INVENTION

This invention relates to a locking means for a transport cradle, the cradle being especially utilised to move pipe units between locations: typically, but not exclusively, within the oil and gas industry. The locking means, particularly, aids in retaining pipes correctly in position during transport.

BACKGROUND TO THE INVENTION

Many industries utilise a string formed of individual tubular units, such as open ended hollow cylindrical pipes to transport fluids or other materials. For example, the oil and gas industry requires, at the drill site, large numbers of tubular pipes. These pipes are used in the drilling process, when driving a drill bit, and for directing oil and gas that is extracted. The pipes further act to protect piping cables that are fed through the pipes to maintain the drill bit function. Pipes are commonly formed of steel, and require specialist equipment for moving and storage. Similarly, the water industry also utilises large numbers of pipes in the construction of a water supply system. The description below is made with reference to the oil and gas industry, although it will be recognised that the invention is applicable in other industries.

Drilling pipes are transported via a number of means to, within, and from drilling sites and factories. Transport and storage of the pipes must be undertaken in such a way as to ensure they do not cause damage, such as by falling or rolling from their set position and also to limit the likelihood of damage to the pipes. A series of pipes, in use, is connected to form a pipe string. Where a single pipe piece is assembled into a pipe string, an individual pipe can ultimately be installed to thousands of feet into the earth, and therefore a fracture resulting from transport that was missed upon inspection can significantly reduce the efficiency of the well. Having to draw the pipe out of the drill holes in order to replace the broken pipe piece is a time-consuming and costly exercise.

It would be inefficient practice to transport pipes individually, and therefore a means for transporting multiple pipes at once, whilst maintaining their integrity is desired. Current methods of moving cradles can either include the use of industrial slings that function by maintaining the pipes within the sling when lifted, but which do not necessarily maintain their shape when not being lifted. A further method and apparatus, disclosed in WO 2011/018614, includes a cradle means, comprising at least two vertical supports, with a number of horizontal pipe-engaging beams. Generally, the horizontal cross-beams are removable from the supports so as to allow pipes to be laid together, in a layer arrangement, between the vertical supports. A horizontal cross-beam is inserted over the top of a pipe layer to maintain the pipe in position and clamp the pipes in place. Once an uppermost horizontal cross-beam is in position, the pipes are generally maintained in position between the horizontal cross-beams by the downward force of the beam. The prior art apparatus has the disadvantage that beams can shift in transit, which in turn can result in the movement of the pipes in relation to the cradle. Although it is common for multiple cradles to be deployed along the length of pipes, even if a shift occurs at only one cradle along the length of the pipe, it is possible that a bend in the pipe can occur and therefore result in damage to the pipe, or pipes on the cradles.

It is to these problems, that the invention attempts to offer a solution.

SUMMARY OF THE INVENTION

In its broadest independent aspect, the invention comprises a releasable lock for a pipe cradle, the releasable lock comprising an elongate arm pivotally mounted at a first end to a pivot end mounted on a cradle frame, pivoting of the elongate arm about the pivot mount displacing the elongate arm between a first release position allowing removal or addition of pipes from/to a cradle and a second, securing position in which pipes are secured in position in the cradle by means of the releasable locking means housed in the region of the second end of the elongate arm, the releasable lock comprises a locking element, said locking element being moveable between a release position allowing pivoting of the elongate arm about the pivot end and an engagement position preventing said pivoting.

Preferably the pivot end is arranged at a lower region on the cradle frame. Further preferably, the locking element engages a cross-beam in a top region of the cradle.

The elongate arm is preferably of a length to extend the entire height of the cradle. Alternatively, preferably the elongate arm length is less than the height of the cradle.

Preferably, the locking element is threadably mounted about the elongate arm. The locking element is further preferably a threaded nut.

The locking portion is constructed to comprise a threaded portion. The nut, in use, is moved about the threaded portion between a cross-beam engaging locked position and an unlocked position. The threaded portion extends substantially along the locking portion. By providing a threaded portion of substantial length, the locking means can accommodate for use when less cross-beams are being used in conjunction with the cradle. The nut can be screwed along the threaded portion until it meets an upper surface of the cross-beam. At this point, the nut is screwed to form a contact fit against the cross-beam, optionally the operator can finger tighten the nut, or use a wrenching means to ensure the nut is tightly fastened.

Preferably the cradle includes an aperture to receive and retain the elongate arm when moving to and in the release position.

The displacement of the elongate arm between the release and securing positions, allows for the installation of pipe-receiving cross-beams to be assembled onto the cradle.

The locking element can be provided with the production of a cradle, where the purchaser requests the cradle be provided with a locking means. Alternatively, the locking means can be fixed to an existing cradle. The design of the locking means is custom built for providing a locking means that can be added to already in use pipe cradles.

The pivot pin engaging end optionally includes at least one pivot plate comprising a pin receiving aperture.

Optionally, the pivot pin engaging end of the elongate arm includes a plate located alongside the pivot pin housing, such that the pivot pin extends from and engages the pivot plate.

The pivot pin engaging end of the elongate arm optionally alternatively, is constructed so as to include two pivot plates, the two pivot plates extending in substantially the same plane as the elongate arm. The pivot plates further optionally extend substantially downward of a diverging plate at the base of the elongate arm.

The locking element preferably includes a hinged or pivotally mounted blocking plate, displacement of the locking element being limited by a plate being movable between a first position in which the plate blocks the aperture and a second position in which the aperture is clear, the blocking plate disposed about a portion of the locking element receiving aperture.

An aperture is conveniently provided along the length of the upward extending side portions of a cradle. The aperture allows the elongate arm to be pivoted from a generally upright locking position into the aperture, and therefore not obstructing the addition of pipe supporting cross-beams into the cradle. The cross-beams are slotted between two cradle uprights and maintained on supporting means located along the height of the cradle uprights. A blocking plate further conveniently extends from a pivot join about the edge of the frame aperture. The blocking plate prevents the elongate arm from pivoting into or out of the cradle aperture. An operator pivots the blocking plate about the pivot point in order to remove the plate from the aperture opening, and allow the elongate arm to be pivoted.

Preferably, the cradle frame comprises two frame uprights, the uprights retaining one or more removable cross-beams extending in their in-use position between the frame uprights. Further preferably, the locking element engages the top of the uppermost cross-beam to lock the elongate arm in the locking position. Yet further preferably said engagement is a frictional engagement.

Preferably, a securing element is included to releasably retain the locking element in the engagement position.

BRIEF DESCRIPTION OF THE FIGURES

The invention is now described with reference to the accompanying drawings which show by way of example only, 2 embodiments of an oil pipe cradle locking device. In the drawings:

FIG. 1 is a cross-sectional front view of the top portion of the locking means;

FIG. 2 is a cross-sectional side view of the locking means in the locked position;

FIG. 3 is a cross-sectional side view of the locking means in the unlocked position;

FIG. 4 is a cross-sectional front view of a loaded cradle;

FIG. 5 is a cross-sectional side view of a loaded cradle;

FIG. 6 is front view of a loaded cradle;

FIG. 7 is an aerial view of a series of loaded cradles; and

FIG. 8 is a perspective view of a second embodiment of a cradle.

DETAILED DESCRIPTION OF THE INVENTION

FIG. 1 shows a cross-sectional enlarged frontal view along A-A of FIG. 4 of one embodiment of an oil pipe cradle locking means 11 in an unlocked, stored position corresponding to the position shown in FIG. 3. The unlocked position can be distinguished by the positioning of threaded portion 2 of the locking means 11 in position behind a blocking plate 5. Displayed in this rendering of the locking means 11 are the elongate arm 1, nut 3, and the cradle aperture 4 for receiving the elongate arm 1.

Further displayed in FIG. 1, is a cross-beam 7 (also referred to as a girder), which in this figure is shown in the unlocking position located between supporting means 8. Each cross-beam 7 comprises upwardly and downwardly constructed extending concave recesses. In use, the locking means 11 is located alongside the cross-beam 7, which generally comprises an aperture at its engaging end, engaging the cradle upright 12.

In this embodiment of the cradle upright 12, the cradle aperture 4 features a wider portion in the top portion of the cradle upright 12. This wider portion allows for the threaded portion 2 to move into the aperture 4 with the nut 3 in place. Once the locking means 11 is in position within the aperture 4, the blocking plate 5 is pivoted over the top of the aperture 4, to the position shown in FIG. 1, and prevents the threaded portion 2 from exiting the aperture 4. The blocking plate 5 is maintained in position about its pivot mount 6. The blocking plate 5 is operated in much the same way when pivoting the threaded portion 2 out of the aperture 4. The blocking plate 5 is pivoted about the pivot pin 6, allowing an operator to pivot the elongate arm 1 out of the aperture, and into the correct position required to secure pipes in position. Returning the blocking plate 5 to its position in front of the aperture 4, prevents the threaded portion 2 from returning in error into the aperture 4. Preferably, the uppermost portion of the threaded portion 2 comprises a lapped end, or ledge. This lapped end, or ledge, prevents the nut 3 from being removed from the threaded portion 2. This reduces the potential loss of nuts 3. In a further embodiment, the threaded portion can be provided with a plate threadably, or otherwise engaging the threaded portion 2. The plate can, in one embodiment be rotated along the threaded portion, to lock into position atop the nut 3 when locked. This aids in the prevention of loosening of the nut 3 in use.

FIG. 2 is a cross-sectional side view of the cradle upright 12, where the locking means 11 is substantially upright and in the locking position. The elongate arm 1 extends vertically upright in this embodiment and parallel to the cradle upright 12. In this position, the nut 3, when tightened against the nearest cross-beam 7, acts to exert a downward force which acts to push the array of cross-beams 7 and pipes 15 against each other, restricting their movement. In more detail, the nut 3 in this configuration, has been rotated and tightened into contact with the top surface of the uppermost cross-beam 7. This locking ensures that each cross-beam 7 maintains a contact fit with each pipe to which it is adjacent on the cradle, thus minimising shifting of the pipes in use. An optional contact fit between the elongate arm 1 and each cross-beam 7, can ensure that the cross-beams are all lined up at their desired configuration, and do not shift between the cradle uprights 12. Optionally, the elongate arm 1 simply rests against a wall of the aperture 4 in the cross-beam 7 to prevent the cross-beam 7 from lateral movement.

In simple terms, the locking means 11 maintains the cross-beam's position both vertically, and horizontally through contact against the top, and sides of the cradle. Also displayed in FIG. 3 is the blocking plate 5, in position across the aperture 4, thus preventing the threaded portion 2 from pivoting into the aperture 4 when the nut 3 is released. The blocking plate 5 allows an operator to pivot the locking means 11 into the substantially upright locking position, and pivot the blocking plate 5 into its closed position in front of the aperture. This allows the operator to manoeuvre about the cradle to lock the locking means 11, without the need to repeat pivoting the locking means 11 out of the aperture 4.

FIG. 3 displays a cross-sectional side view of the cradle upright 12, where the locking means 11 is in the release position allowing movement of cross-beams and pipes. The first end of the leg 1 of the locking means 11 is mounted pivotally by means of a pivot mount at the lower end of the locking means 11, to a pivot block 20. The pivot mount comprises a pivot plate 9, having an aperture (not illustrated) therethrough. A pivot pin 10 extends through the aperture and engages the pivot block 20 to secure the locking means 11 in the required position to prevent unwanted movement. The pivot mount enables the elongate leg 1 of the locking means 11 to pivot between an upright locking orientation, in which the pipes and cross-beams 7 are locked in position for transportation, and a tilted release-load orientation in which pipes and cross-beams 7 can be added or removed. When in the locked position, the threaded portion 2 is housed within the cradle aperture 4, and prevented from pivoting therefrom by the release load blocking plate 5. The cross-beam 7 is located in its in-use position between the support means 8. The pivot plate 9 is located at the base of the cradle upright 12 in this embodiment. The elongate arm 1 is removed from direct contact with all of the cross-beams 7. This embodiment therefore provides multiple means of preventing the locking means 11 from moving from its required position and function.

FIG. 4 shows a cross-sectional side view of the cradle 14. In this figure, the cradle 14 is fully loaded with cross-beams 7 and pipes 15. There are two locking means 11: one located on each cradle upright 12. The locking means 11 are in their substantially upright, locked, position. The nuts 3 are tightened onto the top surface of the uppermost cross-beam 7. From this, the function of the locking means 11 is clear, maintaining the cross-beams 7 in their downward, contact, pipe-engaging position, maintaining pipes 15 in their cradled position. The elongate arms 1 are against the cross-beams 7, and thus preventing any shift between the uprights 12. The advantage of this system, as displayed in FIG. 4, is that there are only two nuts that require movement to provide locking for the system.

FIG. 5 is a cross-sectional front view of one cradle upright 12. This displays the pivot plate 9 on the pivot pin 10, located between two portions of the base of the cradle 14. The two portions prevent the pivot plate 9 from sideway shifting, and the pivot pin 10 ensures that only pivoting motion is possible, about the pivot pin 10.

FIG. 6 is a side view of a loaded cradle 14. When loading the cradle, the method of assembly is as follows. The cradle 14 is initially without removable cross-beams 17, 18, and 19. Pipes 15 are subsequently laid onto a lowermost cross-beam 16 of the cradle, which, on its uppermost portion features a pipe receiving portion, comprising at least one pipe receiving groove 21. The grooves 21 form a receiving portion, with can be shaped to complement the profile of a pipe 15, so as to maintain the pipe's position about the pipe receiving portion. Once the lowermost cross-beam 16 has received the maximum number of pipes 15 that the cross-beam 16 can support, a number generally dependent on the number of pipe receiving grooves 21 (four in the displayed embodiment), a second cross-beam 17 is incorporated into the cradle. The cross-beam 17 fixes to the cradle 14 at support means 8 on each cradle upright 12. The cross-beam 17 comprises upper and lower pipe engaging edges, each comprising a profiled surface for receiving pipes 15. The lower pipe engaging edge presses the pipes downward and maintains the pipe positioning relative to the cradle by supporting the top portion of the pipe, whilst the lowermost portion of the cradle supports the lower portion of the pipe 15. Once pipes 15 have been laid onto the top portion of the cross-beam 17, a further cross-beam 18 is incorporated into the cradle 14. The size of the cradle 14 and the diameter of the pipes dictate the number of cross-beams which can be utilised. Once a top cross-beam is inserted into position, the locking means is pivoted into the locking position, and tightened onto the top edge of the uppermost cross-beam. This locking into position maintains the positioning of the pipes within the cradle.

FIG. 7 is an elevational view of a series of cradles 14 in use along the length of pipes 15. This figure displays the importance of the locking means, in ensuring that the cross-beams are maintained in position within each cradle 14, to ensure level supporting of each of the pipes 15. Where the pipes 15 are lifted by lift wires 32, ensuring that the pipes 15 are maintained in their position within each cradle 14 ensures that no undesired bending of the pipes occurs.

In an alternative embodiment (not illustrated), the elongate arm can be adjusted in length. The adjustable arm features at least two portions, where the lowermost portion forms the widest arm, and thus each subsequent portion slots inside the lower arm. This would be a contact fit, where lengths are fixable by a number of means including pins and/or screws that slot through a series of apertures and maintain the desired arm length.

In a further alternative embodiment, the locking means comprises a spring locking mechanism. The spring is attached between the locking mechanism and the cradle upright. The spring can be configured to either draw the locking means into or out of the cradle aperture. The blocking plate in this embodiment features an operating handle on the outer edge of the cradle, thus avoiding any requirement for an operator to reach into the cradle, therefore reducing the risk of injury caused by the spring-loaded action of the locking means. For an operator to shift the locking means against the tension in the spring, the locking means will be provided with a handle on the outermost edge of the cradle to allow the user to draw the locking means in the desired direction. This allows the user to draw the locking means into the desired position, and have the blocking plate pivot into its aperture-blocking position and thus prevent the spring drawn action of the locking means.

In a further embodiment, the cradle, and locking means can be fitted with a force-measuring apparatus. A force-measuring apparatus operates by measuring the downward force applied by the locking means onto the uppermost cross-beam. Optionally, the force can be measured at each cross-beam connection about the cradle. This addition provides an operator with a means for ensuring that the force applied when tightening the locking means, does not apply too great a force to the pipes. Alternatively, the torque applied to a nut 3 can also be measured during its tightening into the locked position, to provide an indication when sufficient downward force is being applied.

In a further embodiment, the locking mechanism can additionally comprise a locking nut. A locking nut provides resistance to the unscrewing of the nut 3, and therefore acts to maintain the nut 3 in its locked position. A further option for providing a secure locking means is to provide two nuts. The first nut 3 is screwed into the locked position, and this is subsequently followed by the tightening of the second nut. The second nut is locked against the upper edge of the first nut, and is therefore secured against the first nut, providing a means that resists loosening. The use of two nuts can also aid to prevent thread stripping of the locking means threaded portion, thus prolonging the life of the threaded portion of the locking mechanism. A further option is to introduce a castle nut. In this embodiment, the threaded portion comprises a series of apertures for receiving a locking pin. When in use, the castle nut is tightened into position, a locking pin is threaded through an aperture between the raised portions of the castle nut, and locks the nut into position relative to the threaded portion, by preventing rotation of the castle nut, until the locking pin is removed. The locking pin in this case can consist of a cotter pin, which maintains contact against the outer edges of the pin receiving aperture, thus ensuring the pin remains in its in use position.

FIG. 8 shows a perspective view of a second embodiment of a cradle, formed of aluminium, wherein each cradle upright member 22 is formed from a solid aluminium component. Therefore, both the aluminium cradle uprights 22 and aluminium support beams 28, also formed of aluminium, form an overall aluminium lifting cradle 24.

Each aluminium upright 22 is formed by drawing the aluminium material through an extrusion die forming process. During the extrusion process each upright 22 is formed into a solid elongate rectangular body. Each body further comprises three slots 25 which are centrally located within the rectangular body. Each slot 25 is formed by cutting aluminium material from the aluminium body. Each slot 25 provides an elongate aperture which extends from one side wall of the upright 22 to a second side wall which is on the opposite side of the upright body, thereby creating an elongate aperture which extends through the upright body. The lower and central slots are of equal length, while the upper slot is relatively shorter in length.

The upper portion 26 of each upright 22 comprises a central aperture 27, which is used to attach a tether/cable 28 from a crane or other lifting means. The upper portion is a continuous portion of the extruded aluminium body which does not comprise any joining means or welds. The upper portion also comprises an outer surface which is curved to cooperate with the pivoting attachment means of the attached tether/cable. The central aperture is typically circular, elliptical, square or the like in shape.

The provision of an upright from extruded aluminium has a number of technical advantages. First, the overall weight of the cradle is reduced compared to using other materials such as steel. This can lead to heavier payloads such as pipes being able to be lifted in a single transfer, which can reduce costs and time for the user. Secondly, the inclusion of slots within an upright also reduces the mass of each upright, again allowing for a heavier payload.

The central aperture 27 located within the upper portion of the upright member is mechanically stronger than prior art systems which comprise joining means or joints such mechanical fasteners, welded portion, etc. The continuous single body provides an upright member with improved mechanical strength, which enables the cradle to lift/move heavier payloads.

The invention claimed is:

1. A releasable lock for a pipe cradle, the releasable lock comprising:
   an elongate arm pivotally mounted at a first end to a pivot end mount mounted on a cradle frame, the elongate arm being pivotally mounted such that pivoting of the elongate arm about the pivot mount displaces the elongate arm between (i) a first, release position allowing removal or addition of pipes from/to the pipe cradle, and (ii) a second, securing position in which pipes are secured in position in the pipe cradle,
   a releasable locking element in a region of a second end of the elongate arm, said releasable locking element being moveable between (i) a release position allowing pivoting of the elongate arm about the pivot mount to the first, release position, and (ii) an engagement position preventing said pivoting of the elongate arm and thereby securing the elongate arm in the second, securing position,
   an aperture along a length of an upwardly extending side portion of the pipe cradle, the aperture enabling movement of the elongate arm between (i) the first, release position in which the elongate arm leaves the aperture, and (ii) the second, securing position in which the aperture receives the elongate arm, and
   a pivotally mounted blocking plate disposed about a portion of the aperture, the blocking plate being pivotally movable between (i) a first position in which the blocking plate blocks the aperture and prevents pivotal movement of the elongate arm between the first, release position and the second, securing position, and (ii) a second position in which the aperture is clear and enables pivotal movement of the elongate arm between the first, release position and second, securing position.

2. The releasable lock according to claim 1, wherein the pivot mount is arranged at a lower region on the cradle frame.

3. The releasable lock according to claim 2, wherein the locking element engages a cross-beam in a top region of the pipe cradle.

4. The releasable lock according to claim 1, wherein the elongate arm is at least as long as the entire height of the pipe cradle.

5. The releasable lock according to claim 1 wherein the elongate arm length is less than the height of the pipe cradle.

6. The releasable lock according to claim 1, wherein the locking element is threadably mounted about a thread on the elongate arm.

7. The releasable lock according to claim 6, wherein the locking element is a threaded nut.

8. The releasable lock according to claim 6, wherein the thread on the elongate arm extends along a length of the elongate arm.

9. The releasable lock according to claim 1, wherein the aperture is configured to receive and retain the elongate arm when moving to and in the release position.

10. The releasable lock according to claim 1, wherein the pivot mount comprises a pivot pin housed on the pipe cradle.

11. The releasable lock according to claim 10, wherein the first end of the elongate arm includes at least one pivot plate comprising a pin receiving aperture.

12. The releasable lock according to claim 1, wherein the first end of the elongate arm includes a plate located alongside a pivot mount housing, such that the pivot mount extends from and engages the plate.

13. The releasable lock according to claim 10, wherein the first end of the elongate arm includes two pivot plates, the two pivot plates extending in substantially the same plane as the elongate arm.

14. The releasable lock according to claim 13, wherein the two pivot plates extend substantially downward of a diverging plate at the first end of the elongate arm.

15. The releasable lock according to claim 1, wherein the cradle frame comprises two frame uprights, the uprights retaining one or more removable cross-beams extending in their in-use position between the frame uprights.

16. The releasable lock according to claim 15, wherein the locking element engages the top of the uppermost cross-beam to lock the elongate arm in the locking position.

17. The releasable lock according to claim 16, wherein said engagement is a frictional engagement.

18. The releasable lock according to claim 1, wherein a securing element is included to releasably retain the locking element in the engagement position.

\* \* \* \* \*